United States Patent
Leon et al.

(10) Patent No.: US 8,612,067 B2
(45) Date of Patent: Dec. 17, 2013

(54) SYSTEM FOR DEICING AND/OR DEFOGGING AN AIRCRAFT SURFACE, METHOD FOR CONTROLLING SAME, AND AIRCRAFT EQUIPPED WITH SAME

(75) Inventors: Joseph Leon, Balma (FR); Jean-Yves Vilain, Pibrac (FR)

(73) Assignee: Airbus Operations S.A.S., Toulouse (FR)

( * ) Notice: Subject to any disclaimer, the term of this patent is extended or adjusted under 35 U.S.C. 154(b) by 979 days.

(21) Appl. No.: 12/067,553

(22) PCT Filed: Sep. 20, 2006

(86) PCT No.: PCT/FR2006/002153
§ 371 (c)(1),
(2), (4) Date: Mar. 20, 2008

(87) PCT Pub. No.: WO2007/034074
PCT Pub. Date: Mar. 29, 2007

(65) Prior Publication Data
US 2008/0258010 A1    Oct. 23, 2008

(30) Foreign Application Priority Data
Sep. 23, 2005   (FR) ..................................... 05 09764

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ......................................................... 701/3

(58) Field of Classification Search
USPC ................... 701/3, 10, 14; 244/134 R–134 F;
374/109, 142; 73/29.01; 340/602, 962;
60/39.092; 219/202–203; 343/704;
191/62
See application file for complete search history.

(56) References Cited

U.S. PATENT DOCUMENTS

| 4,403,292 A | | 9/1983 | Ejzak et al. | |
|---|---|---|---|---|
| 5,466,974 A | * | 11/1995 | Sutrina et al. | ................... 307/38 |

(Continued)

FOREIGN PATENT DOCUMENTS

| EP | 1 353 247 A2 | 10/2003 |
|---|---|---|
| FR | 2 832 011 | 5/2003 |

(Continued)

OTHER PUBLICATIONS

Office Action issued Sep. 20, 2011, in Japanese Patent Application No. 2008-531734 with English translation.

*Primary Examiner* — Khoi Tran
*Assistant Examiner* — Harry Oh
(74) *Attorney, Agent, or Firm* — Oblon, Spivak, McClelland, Maier & Neustadt, L.L.P.

(57) ABSTRACT

The invention concerns a system for deicing and/or defogging an aircraft surface (4) comprising: a temperature sensor (5) located proximate said surface (4) and adapted to generate a temperature information (TPT); a computer (20) adapted to generate a control information (CMD) based on the temperature information (TPT) and to transmit the control information (CMD) over a computer network (18) of the aircraft; an electric power supply system (8) located in the electrical center of the aircraft (18) and comprising a switch (12) adapted to be switched based on the control information (CMD); a heating element (6) located proximate said surface (4) and electrically powered via said switch (12). The invention also concerns a method for controlling such a system.

14 Claims, 1 Drawing Sheet

(56) References Cited

U.S. PATENT DOCUMENTS

| | | | |
|---|---|---|---|
| 5,496,989 A * | 3/1996 | Bradford et al. | 219/497 |
| 5,515,282 A | 5/1996 | Jackson | |
| 6,181,235 B1 | 1/2001 | Smith | |
| 6,414,282 B1 * | 7/2002 | Ice et al. | 219/481 |
| 6,723,971 B1 * | 4/2004 | Petrenko et al. | 219/770 |
| 6,731,225 B2 * | 5/2004 | Vopat | 340/962 |
| 6,753,513 B2 * | 6/2004 | Goldberg et al. | 219/497 |
| 7,523,889 B2 * | 4/2009 | Bourjac et al. | 244/134 D |
| 2003/0152077 A1 | 8/2003 | Saint Etienne et al. | |
| 2003/0155467 A1 * | 8/2003 | Petrenko | 244/134 R |
| 2003/0195673 A1 | 10/2003 | Foch et al. | |
| 2005/0035110 A1 | 2/2005 | Petrenko | |
| 2006/0086715 A1 * | 4/2006 | Briggs | 219/488 |
| 2007/0112480 A1 * | 5/2007 | Smith et al. | 701/10 |

FOREIGN PATENT DOCUMENTS

| | | |
|---|---|---|
| FR | 2 863 586 | 6/2005 |
| GB | 2 410 481 | 8/2005 |
| JP | 55-106037 | 8/1980 |
| JP | 10-505040 | 5/1998 |
| JP | 2005-517579 | 6/2005 |

* cited by examiner

SYSTEM FOR DEICING AND/OR DEFOGGING AN AIRCRAFT SURFACE, METHOD FOR CONTROLLING SAME, AND AIRCRAFT EQUIPPED WITH SAME

The invention relates to a system for deicing and/or defogging an aircraft surface, such as, for example, a window of the pilot's cabin of an airplane, and to a method for controlling such a system. The invention also relates to an aircraft equipped with such a system.

Deicing and defogging of aircraft surfaces are generally achieved by means of heating elements, such as resistors, for example.

In current solutions, the heating elements are supplied electrically by a dedicated system, sometimes referred to as heating calculator (or WHC, for the English "Window Heat Computes"), which comprises not only operating control logic but also a switch switched in such a way as to transmit to the heating elements electric power corresponding to the desired heating level.

Thus, according to this concept, the dedicated system is supplied continuously by the central electric system of the aircraft but it delivers electric power to the heating elements in a variable quantity, determined as a function of the temperature measured by sensors situated in the region of the surface to be deiced.

The dedicated system also performs functions of monitoring the current that it delivers to the heating elements as well as correct operation of the sensors.

The traditional solution provides that the different elements of the dedicated system are situated in the same assembly, generally close to the cabin, which may prove disadvantageous in terms of space requirement and weight, and it also requires that this assembly be provided with all the circuits necessary for its operation (especially a power switch and a logic circuit that includes a calculator).

In order to avoid these problems and to optimize the design of the deicing and/or defogging system to thus to benefit from functionalities that exist in other systems of the aircraft, the invention proposes a system for deicing and/or defogging an aircraft surface, characterized by:
- a temperature sensor situated close to the said surface and capable of generating a temperature information stream;
- a calculator capable of generating a control information stream from the temperature information stream and of sending the control information stream over an information network of the aircraft;
- an electric supply system capable of receiving the control information stream over the information network and comprising a switch capable of being switched as a function of the control information stream;
- a heating element situated close to the said surface and supplied electrically via the said switch.

Switching of the switch is therefore relocated into the electric supply system, meaning in general into the central electric system of the airplane, which makes it possible to eliminate the switched switch normally situated in the cabin.

"Close to the surface" is understood here as on the surface or at a distance from it that permits a physical interaction with it.

As an example, the electric supply system is equipped with a microprocessor connected to the information network. The microprocessor can therefore receive the control information stream and command the switch to switch as a function of the control information stream. In practice, the microprocessor can command the switch to switch by means of a signal whose cyclic ratio depends on the control information stream.

According to one embodiment, the calculator receives the temperature information stream of the sensor via an analog link.

As an example, the information network itself is an airplane network of the Ethernet type.

According to one possible mode of use, the calculator is included in a heating management module connected to the information network. The heating management module can then comprise sensor-monitoring means capable of sending an alarm over the information network in the case of dysfunctioning of the sensor. This module, which may be situated in any location of the airplane (such as the avionics bay), thus manages the control logic of the system instead of the traditionally used dedicated system.

Furthermore, the electric supply system may be equipped with means for measuring the current passing through the switch in order to control the opening of the switch and/or to generate an alarm over the information network if a threshold is crossed. The functions of circuit breaker and monitoring of correct operation are therefore integrated into the supply system.

In these two cases, an alarm management system connected to the information network can then cause display of a signal on a display device of the cabin in the case of reception of the said alarm.

An example of the said surface is a window of a pilot's cabin of the aircraft.

The invention also proposes a method for controlling a system for deicing and/or defogging an aircraft surface, characterized by the following steps:
- determining a control information stream on the basis of a temperature information stream received from a temperature sensor situated close to the said surface;
- sending the control information stream over an information network of the aircraft;
- receiving the control information stream by an electric supply system;
- switching, as a function of the control information stream, a switch through which there is electrically supplied a heating element situated close to the said surface.

The switch is generally part of the electric supply system and thus is situated in the central electric system of the aircraft.

The method may comprise firstly a step in which the sensor sends the temperature information stream via the analog link.

When the said switching is commanded by a microprocessor of the electric supply system, the method may also comprise a step in which the said microprocessor receives the control information stream.

Another objective is an aircraft implementing these inventions.

Other characteristics of the invention will become more apparent by reading the description provided hereinafter with reference to the attached drawings, wherein.

Figure 1:
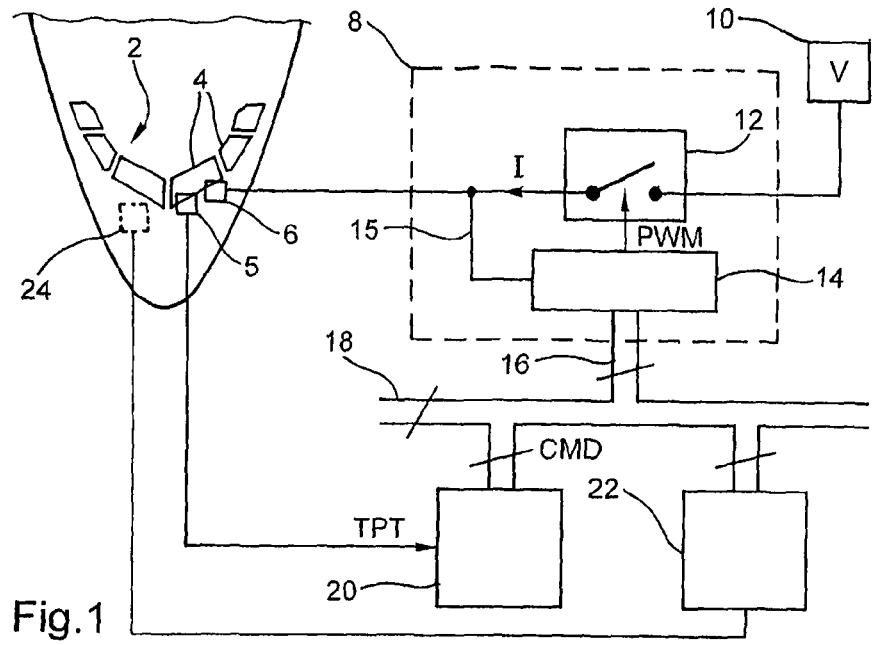
FIG. 1 represents the main elements of a deicing system according to the teachings of the invention.

FIG. 1 schematically represents pilot's cabin 2 of an aircraft having a plurality of windows 4, through which the crew can observe the outside of the aircraft.

With each of these windows there are associated heating elements 6 (for simplicity, only one is represented in FIG. 1). When they are activated (or in other words being supplied electrically), heating elements 6 permit deicing (and thus in general defogging) of windows 4.

As an example, heating elements 6 have the form in practice of resistive circuits that traverse window 4 in the region of its surface; these resistive circuits can be interposed, for example, between different glass layers of the window.

The operation of a single heating element 6 is described hereinafter, and the operation of the other heating elements can be inferred by analogy.

Incidentally, the electric circuits are represented in FIG. 1 by a single wire, although a current-return path (for example, by means of ground connections) is also present in practice.

Heating element 6 is supplied by a voltage source 10 across a power switch 8 that makes it possible to regulate the electric power transmitted to heating element 6 as described hereinabove.

As an example, voltage source 10 is formed by the combination of an inverter and a rectifier. It produces alternating voltage (generally 115 VAC or 200 VAC) drawn from electricity-generating means of the aircraft.

Power switch 8 comprises an electrically controlled switch 12 and a microprocessor 14, which has a PWM output for controlling switch 12. The value of the signal present at the PWM output controls closing and opening of switch 12. Switch 12 is interposed between voltage source 10 and heating element 6.

Microprocessor 14 is also equipped with a terminal 15 for measuring the current I passing through switch 12.

Via a bus, and by means of an information network 18 (commonly known as avionic network, with operation of the "Ethernet" type, for example, such as an AFDX network described in French Patent Application FR 2832011, for example), microprocessor 14 is connected to other electronic entities described hereinafter.

Power switch 8 and voltage source 10, which form an electric supply system for heating element 6, are preferably situated in the central electric system of the aircraft.

Numerous functional modules (sometimes referred to as CPIOM for the English "Core Process Input Output Module") are connected to network 18. Among these functional modules, FIG. 1 represents those that participate in the deicing system according to the invention, or in other words a window-heating management module 20 and an alarm management module 22.

Window-heating management module 20 is able to dialog with microprocessor 14 of power switch 8 and with alarm management module 22 by means of information network 18.

In addition, window-heating management module 20 receives a temperature information stream TPT in analog form from a sensor 5 situated at the level of window 4 (generally in window 4) supporting heating element 6. (For simplicity, just as for element 6, only a single sensor 5 is represented).

Window-heating management module 20 implements the following functions, as described in detail hereinafter:

monitoring of the temperature information stream TPT received from sensor 5 (and also the validity of this information, or in other words the proper operation of sensor 5);

control of the regulation of heating element 6 as a function in particular of the measured temperature, that is, in practice, the determination of a control information stream intended for power-switching circuit 8, on the basis in particular of temperature information stream TPT received from sensor 5;

sending of an alarm to alarm management system 22 in the case of detection of an operating problem, for example in sensor 5.

It will be noted that processing of the control information stream may also make use of other parameters, such as, for example, the speed of the airplane or the power control mode (manual or automatic) and even more easily if module 20 is situated on avionic network 18.

As already mentioned, alarm management system 22 is able to dialog with the other functional modules (especially window-heating management module 20) and power switch 8 by means of information network 18.

Alarm management module 22 can also command needed actions in the case of reception of an alarm signal from one of the other entities. As an example, it can cause display of a symbol representative of the alarm in question on a display device 24 situated in cabin 2.

Functional modules 20, 22 may be situated at any location whatsoever of the aircraft, because of the fact that they interact with the other elements by means of network 18. Functional modules 20, 22 are preferably grouped in a dedicated location of the airplane referred to in general as the avionics bay.

Figure 2:
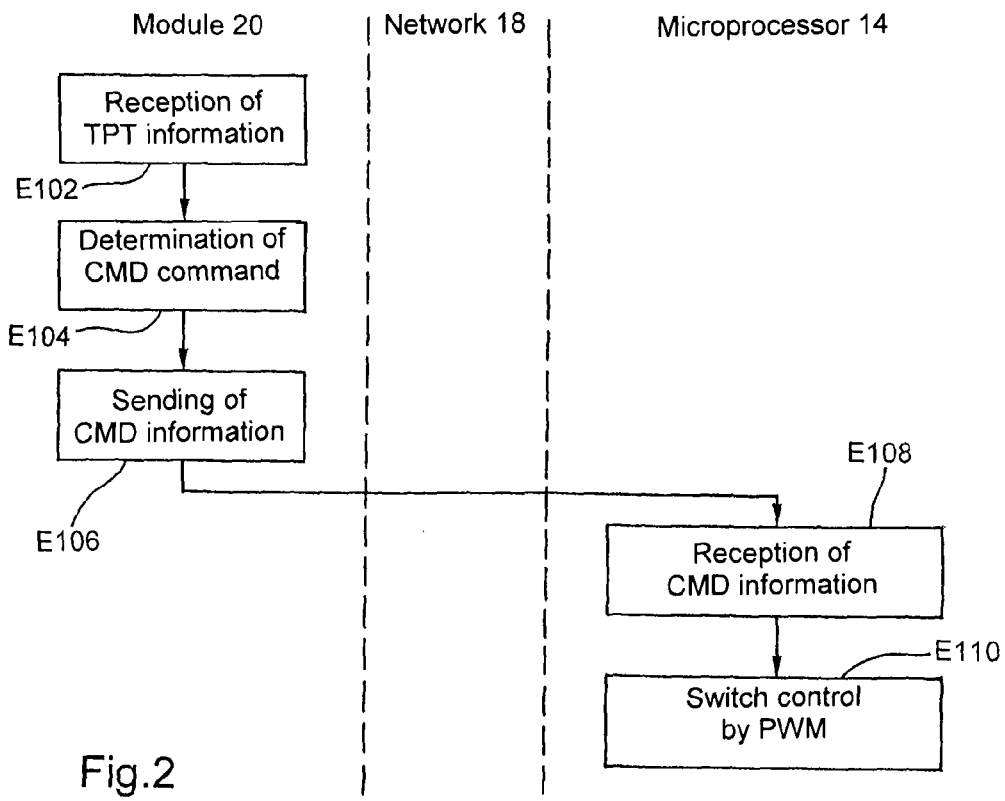
FIG. 2 is a logic diagram illustrating the operation of the system of FIG. 1 under normal conditions.

The operation of the deicing system under normal conditions will now be described with reference to FIG. 2.

Window-heating management module 20 receives temperature information stream TPT from sensor 5 (step E102) and, on the basis of this information stream in particular, determines a command CMD to be sent to power switch 8 (step E104).

As an example, control information stream CMD is obtained as a function of temperature information stream TPT and of a temperature setpoint (stored in module 20, for example, and capable of being regulated if necessary) by means of correspondence tables stored in module 20.

As an example, control information stream CMD represents the proportion of the nominal power of the heating element that must be released for the purpose of approaching the temperature setpoint. Alternatively, it could represent the cyclic ratio with which the switch must be alternately opened and closed.

Control information stream CMD is sent by window-heating management module 20 over information network 18 (step E106) in the form of digital data.

In this way control information stream CMD can be received by microprocessor 14 of power switch 8 (step E108).

On the basis of control information stream CMD, microprocessor 14 determines the cyclic ratio of control signal PWM to be sent via the control terminal of switch 12 (step El 10) in order to obtain release of the desired heating power at heating element 6 (or in other words in accordance with control information stream CMD).

Under normal conditions, the cooperation of the different elements just mentioned makes it possible in this way to achieve regulation of the temperature at window 4 and consequently deicing (as well as defogging) thereof.

Several examples of departures from normal conditions will now be described.

As already indicated, microprocessor 14 is equipped with a terminal 15 for monitoring the current I passing through switch 12. When microprocessor 14 determines that current I is too large (for example because of a malfunction of switch 12 or an overvoltage at voltage source 10), it commands switch 12 to open. In this way, power switch 8 also performs the function of a circuit breaker.

In the case of detection of an anomaly in measurement of the current passing through switch 12, microprocessor 14 can additionally send a corresponding alarm signal to alarm management module 22, so that the anomaly can be signaled in this way to the crew via display device 24.

Another type of alarm in the deicing system described in the foregoing is dysfunctioning of sensor 5.

As already mentioned, window-heating management system 20 not only receives a temperature information stream TPT but also determines information about correct operation by virtue of monitoring of sensor 5.

In the case of detection of an operating anomaly of sensor 5 by window-heating management module 20, the latter sends a corresponding alarm signal over information network 18 to alarm management system 22. This is therefore able to alert the crew to the failure of sensor 5 by displaying a dedicated symbol on display device 24.

In the case of detection of dysfunctioning of sensor 5, window-heating management module 20 can also impose on control information stream CMD a value that assures reliable operation regardless of the effective temperature (which hypothetically is not determined) at window 4, namely, for example, a control information stream CMD that leads to absence of heating, or alternatively that represents heating at a power of heating element 6 determined as a function of other parameters available in the aircraft.

The example just described represents only one possible embodiment of the invention, which is not limited thereto.

The invention claimed is:

1. A system for deicing and/or defogging an aircraft surface, comprising:
    an electric supply system situated in a central electric system of the aircraft;
    a calculator situated in an avionics bay of the aircraft;
    an information network connecting the electric supply system and the calculator;
    a temperature sensor situated close to the surface and configured to generate a temperature information stream;
    the calculator being configured to generate a control information stream from the temperature information stream and to send the control information stream over the information network of the aircraft;
    the electric supply system being configured to receive the control information stream over the information network and including a switch configured to be switched as a function of the control information stream; and
    a heating element situated close to the surface and supplied electrically via the switch,
    wherein the information network is an AFDX network,
    wherein the calculator stores in advance a plurality of correspondence tables that include a temperature setpoint, the control information stream is obtained as a function of the temperature information stream and the temperature setpoint based on the correspondence tables, and
    wherein the electric supply system includes a microprocessor that connects to the information network, the microprocessor is configured to receive the control information stream, determine a cyclic ratio with which the switch must be alternately opened and closed to approach the temperature setpoint by determining the cyclic ratio that releases a desired heating power at the heating element in accordance with the control information stream, and command the switch to switch as a function of the control information stream, by way of a signal that has the determined cyclic ratio.

2. The system according to claim 1, wherein the calculator is configured to receive the temperature information stream of the sensor via an analog link.

3. The system according to claim 1, wherein the calculator is included in a heating management module that connects to the information network.

4. The system according to claim 3, wherein the heating management module includes a unit configured to monitor the sensor and to send an alarm over the information network in the case of dysfunctioning of the sensor.

5. The system according to claim 1, wherein the electric supply system is equipped with a unit configured to measure a current passing through the switch and to generate an alarm over the information network if a threshold is crossed.

6. The system according to claim 4 or 5, further comprising an alarm management system that connects to the information network, the alarm management system being configured to cause display of a signal on a display device of the cabin in the case of reception of the alarm.

7. The system according to claim 1, wherein the electric supply system is equipped with a unit configured to measure a current passing through the switch and to command the switch to open if a threshold is crossed.

8. The system according to claim 1, wherein the information network is of the Ethernet type.

9. The system according to claim 1, wherein the surface is a window of a pilot's cabin of the aircraft.

10. A method for controlling a system for deicing and/or defogging an aircraft surface, the system including an electric supply system situated in a central electric system of the aircraft, a calculator situated in an avionics bay of the aircraft, and an information network connecting the electric supply system and the calculator, the method comprising:
    determining, at the calculator, a control information stream on the basis of a temperature information stream received from a temperature sensor situated close to the surface;
    sending, from the calculator, the control information stream over the information network of the aircraft;
    receiving the control information stream by the electric supply system;
    switching, as a function of the control information stream, a switch situated in the electric supply system of the aircraft and through which there is electrically supplied a heating element situated close to the surface,
    wherein the information network is an AFDX network,
    wherein the method further includes storing in advance, at the calculator, a plurality of correspondence tables that include a temperature setpoint, the control information stream is obtained as a function of the temperature information stream and the temperature setpoint based on the correspondence tables, and
    wherein the electric supply system includes a microprocessor that connects to the information network, the microprocessor receiving the control information stream, determining a cyclic ratio with which the switch must be alternately opened and closed to approach the temperature setpoint by determining the cyclic ratio that releases a desired heating power at the heating element in accordance with the control information stream, and commanding the switch to switch as a function of the control information stream, by way of a signal that has the determined cyclic ratio.

11. The method according to claim 10, further comprising sending, by the sensor, the temperature information stream via an analog link.

12. An aircraft comprising:
    a surface to be deiced and/or defogged;
    a central electric system;
    an avionics bay;
    an electric supply system situated in the central electric system;
    a calculator situated in an avionics bay of the aircraft;

an information network connecting the electric supply system and the calculator;

a temperature sensor situated close to the surface and configured to generate a temperature information stream;

the calculator being configured to generate a control information stream from the temperature information stream and to send the control information stream over the information network of the aircraft;

the electric supply system being configured to receive the control information stream over the information network and including a switch configured to be switched as a function of the control information stream; and a heating element situated close to the surface and supplied electrically via the switch, wherein the information network is an AFDX network, wherein the calculator stores in advance a plurality of correspondence tables that includes a temperature setpoint, the control information stream is obtained as a function of the temperature information stream and the temperature setpoint based on the correspondence table, and wherein the electric supply system includes a microprocessor that connects to the information network, the microprocessor is configured to receive the control information stream, determine a cyclic ratio with which the switch must be alternately opened and closed to approach the temperature setpoint by determining the cyclic ratio that releases a desired heating power at the heating element in accordance with the control information stream, and command the switch to switch as a function of the control information stream, by way of a signal that has the determined cyclic ratio.

13. An aircraft comprising a system configured to implement the method of claim 10.

14. The system according to claim 1, wherein the central electric system of the aircraft, which includes the switch, is an area of the aircraft other than a cabin of the aircraft.

\* \* \* \* \*